(No Model.)

W. M. BITLER.
Covering for Steam Pipes, Boilers, &c.

No. 237,363. Patented Feb. 8, 1881.

Attest:
J. Henry Kaiser.

Inventor:
William M. Bitler.
By Francis D. Pastorius
Atty.

UNITED STATES PATENT OFFICE.

WILLIAM M. BITLER, OF PHILADELPHIA, PENNSYLVANIA.

COVERING FOR STEAM-PIPES, BOILERS, &c.

SPECIFICATION forming part of Letters Patent No. 237,363, dated February 8, 1881.

Application filed May 31, 1880. (No model.)

*To all whom it may concern:*

Be it known that I, WILLIAM M. BITLER, a citizen of the United States, residing at Philadelphia, in the county of Philadelphia and State of Pennsylvania, have invented a new and useful Composition of Matter for Coating Steam-Pipes, Boilers, and other Heated Surfaces to Prevent Radiation, of which the following is a specification.

Figure 1:
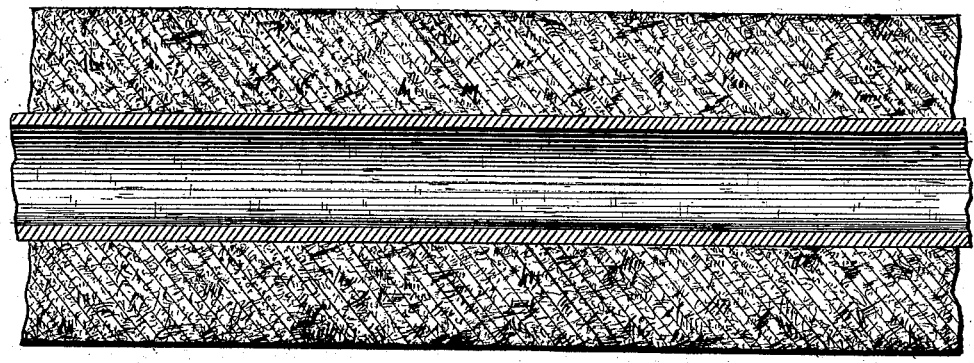
Figure 2:
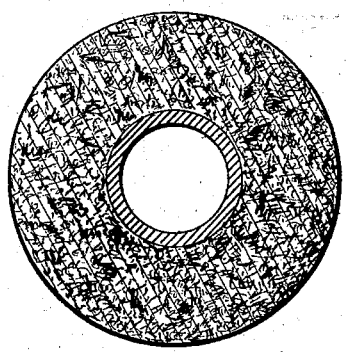

In the drawings, Figure 1 is a longitudinal section of a steam-pipe with my covering applied. Fig. 2 is a transverse section of the same.

To prepare my composition, take a quantity of tough clay, marl, or fuller's earth, and mix it with water, in any suitable mixing-machine, until it becomes of the proper consistency; then to one bushel of this clay I add four bushels of dry, or nearly dry, sawdust, the whole to be thoroughly mixed. The sawdust absorbs a portion of the clay, and produces a fibrous and elastic material which will not crack on the expansion or contraction of the boiler or other heated surface to which it may be applied, and will not char.

The mixture is applied to the surface to be protected while the latter is hot, and may be of any thickness required, usually from one to three inches, which can be obtained by varying the coats or applications.

The porous nature of this mixture is such that when dry it possesses numerous air-cells, which makes it a more perfect non-conductor.

I am aware that water, clay, marl, or fuller's earth and sawdust have been used in connection with other ingredients, and therefore do not, broadly, claim such; but

I claim—

The herein-described covering composition for coating steam-pipes, boilers, and other heating-surfaces, consisting of water, clay, marl, or fuller's earth, and sawdust in about the proportions specified and applied, as herein set forth.

In testimony whereof I hereunto sign my name in presence of two subscribing witnesses.

WILLIAM M. BITLER.

Witnesses:
 JOHN DEAN,
 FRANCIS D. PASTORIUS.